3,164,630
PROCESSES FOR THE PRODUCTION OF POLYMERIZABLE SALTS OF XYLYLENE DIAMINES AND DICARBOXY ACIDS
Edward W. Pietrusza, Morristown, N.J., assignor to Allied Chemical Corporation, New York, N.Y., a corporation of New York
No Drawing. Filed June 17, 1960, Ser. No. 36,746
8 Claims. (Cl. 260—501)

This invention relates to processes for the catalytic hydrogenation of terephthalonitrile, isophthalonitrile, or meta- or para-cyanobenzylamine, in a solution or slurry containing a dicarboxy acid to produce polymerizable salts of xylylene diamines and the dicarboxy acid. The invention further relates to the combination of those processes with the further treatment of solutions or slurries of polymerizable salts thus obtained to produce polyamides.

It is known that amines may be formed by the catalytic hydrogenation of cyano compounds. For example, JACS, 47, 3051 (1925) describes hydrogenating benzonitrile and p-tolunitrile in solution in absolute alcohol or glacial acetic acid in the presence of a platinum oxide catalyst to form the corresponding aryl amines. Depending upon the particular cyano compound hydrogenated or the nature of the solvent in which it was reduced, various amounts of primary and secondary amines were formed. In all but one experiment the secondary amine was the principal product of the reduction. In the one case a mixture containing a 62/38 ratio of the primary and secondary amines was formed.

In order to suppress this formation of secondary amines, it is known to have present in the solution of cyano compound which is hydrogenated a strong inorganic acid, such as hydrochloric or sulfuric acid, which can react with the primary amine to form the salt of the acid. For example, U.S. Patent 2,784,230, issued March 5, 1957, discloses hydrogenating isophthalonitrile or terephthalonitrile in solution in acetic acid containing concentrated sulfuric acid and a palladium-on-charcoal catalyst, to obtain the meta- and para-xylylene diamines in the form of their sulfate salts.

Heretofore in producing polyamides from amines and dicarboxy acids it has been the practice to prepare separately the amine and acid and to treat these materials to form the desired polyamide.

I have now discovered the cyano compounds, meta- and para-cyanobenzylamines, isophthalonitrile and terephthalonitrile can be effectively hydrogenated to form directly the polymerizable salt of a xylylene diamine and a dicarboxy acid, by contacting with hydrogen in the presence of a hydrogenation catalyst, a dispersion of the cyano compound and a dicarboxy acid in a liquid solvent for these compounds. The resulting polymerizable salt may then be treated to produce a polyamide.

The polymerizable salts of the meta- or para-xylylene diamines of any dicarboxy acid can be prepared by the process of my invention, those particularly desirable for making polymers, have the compositions represented by the formula

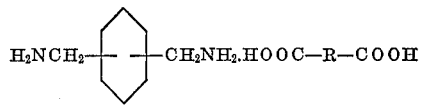

in which the two substituents on the benzene ring of the diamine moiety are attached to non-adjacent carbon atoms, and R represents a divalent, saturated aliphatic or aralkylene radical containing at least two carbon atoms in an alkylene carbon chain connecting the two carboxy radicals, a cycloaliphatic radical, an aralkylene radical or an arylene radical in which the two carboxy radicals are on non-adjacent carbon atoms of the ring structure. These acids include the polymethylene dicarboxy acids, such as succinic, pimelic and other acids of the homologous group having the formula $HOOC-(CH_2)_n-COOH$ in which $n$ is an integer from 2 to 16. Particularly useful are the polymerizable salts of those diamines with the polymethylene dicarboxy acids, adipic, azelaic and sebacic acids. The salts of those diamines with the branched chain, aliphatic dicarboxy acids, such as alpha-methyl adipic acid or alpha-hexyl sebacic acid; of the aromatic dicarboxy acids, such as the phthalic acids; of cycloaliphatic dicarboxy acids, such as para-hexahydrophthalic acid; of the bis-(alkylcarboxy) aromatic acids, such as phenylenediacetic acid or phenylenedipropionic acid; or of the polynuclear, aromatic dicarboxy acids, such as naphthalic acid-(1,4); all can be prepared by the process of my invention.

The solvent is one which is chemically inert towards, i.e. does not react with, the cyano compound, the dicarboxy acid or the xylylene diamine formed by hydrogenation of the cyano compound to prevent the formation of the desired polymerizable salt. Preferably it is water or a solution in water of a saturated aliphatic alcohol. When an aqueous alcohol solvent is used, it is preferred to employ one containing up to 80 volume percent of an alcohol of the homologous series methanol through the butyl alcohols.

The amounts of the cyano compound and/or dicarboxy acid employed in making up the reaction mixture need not be limited to those which go completely into solution in the solvent present. As a general rule, the salts of the xylylene diamines and dicarboxy acids have higher solubilities in solvents for the cyano compounds and dicarboxy acids than do one or the other of these starting materials employed in my process. Accordingly, liquids in which these materials have quite low solubilities can be employed as the solvent. As the cyano compound in solution is reduced to the diamine it will react with the dicarboxy acid to form a solution of the salt. This withdrawal of the starting materials from the solution permits continued solution and reaction of the starting materials initially present as solid dispersed in the liquid, to form the desired polymerizable salt. Nor does the continuation of the reaction depend upon the amount of polymerizable salt not exceeding its solubility in the solvent. The end product of the hydrogenation can be a slurry of the solid salt and liquid phase present.

In operating in accordance with my invention, a solution or slurry containing about a 1:1 mole ratio of the cyanobenzylamine or phthalonitrile and the dicarboxy acid is treated with the hydrogen. Preferably about 1 to 10 mole percent excess, of the dicarboxy acid over this 1:1 mole ratio is present. It is important that about the 1:1 mole ratio of cyano compound to dicarboxy acid be maintained in the solution or slurry during the hydrogenation in order to recover good yields of the polymerizable salt of the amino acid rather than forming a product containing an unduly high content of difunctional material, which acts as a polymerization terminating agent making the product unsuitable for the production of polymers.

As respects the catalyst present to promote the hydrogenation of the cyano compounds, numerous hydrogenation catalysts are known and are active for the hydrogenation of the cyano group attached to an aromatic nucleus. Any such catalysts can be used to promote the hydrogenation of the cyanobenzylamine, terephthalonitrile or isophthalonitrile in the presence of the dicarboxy acid. Because of their high activity for this hydrogenation reaction at relatively low temperatures, little above room temperatures, palladium distributed on a porous carbon support or finely divided platinum oxide are preferred catalysts for use in operating in accordance with my invention. However, finely divided noble metal catalysts such as platinum, ruthenium, or rhodium, or Raney nickel or Raney cobalt catalysts are suitably used to promote the hydrogenation of the cyano group of the cyanobenzylamines or phthalonitriles in the presence of the dicarboxy acid. Methods for making such catalysts, both with and without the catalytically active material being distributed on carriers, are well known to the art and some are manufactured and marketed for use in hydrogenation processes.

With respect to the conditions of temperature, pressure of hydrogen gas, intimacy of contact between the hydrogen gas, and the solution containing the cyano compound, and activity of the catalyst employed, each affects the time required to attain a given degree of hydrogenation of the cyano compound. In general, the higher the hydrogenation activity of the catalyst and the higher the temperatures, the shorter is the time required for completion of the reaction of the hydrogen with the cyano compound. At the lower temperatures, however, by-product formation is kept to a minimum and high yields of the pure xylylene diamine salts are obtained. Hydrogen pressures from atmospheric to 1400 p.s.i. or higher can be employed. Adequate contact between the hydrogen and the reaction mixture can be obtained by shaking the vessel containing the solution of cyano compound and hydrogen, by a mechanical agitator inside the vessel or by bubbling the hydrogen gas into and through the solution.

As to preferred conditions; with the palladium-on-carbon or platinum dioxide catalysts which I have found particularly active, the solution or slurry of phthalonitrile or cyanobenzylamine is maintained at temperatures of about 20° C. to about 80° C. under a pressure of hydrogen gas in the range about 10 p.s.i. to about 1000 p.s.i. Raney nickel or Raney cobalt catalysts require higher temperatures of about 120° C. to 140° C. to promote the hydrogenation reaction and temperatures above this range are preferably employed when these catalysts are used.

My invention further comprises processes in which a solution in water of polymerizable salt produced by treating with hydrogen the cyano compound and dicarboxy acid dispersed in water until the cyano compound has been substantially completely hydrogenated and converted into its polymerizable salt of the dicarboxy acid, is further treated to produce a polyamide. To this end the catalyst is separated from the solution of diamine salt prepared in a manner described above. When a relatively dilute solution has been prepared, it is preferably evaporated to concentrate it short of precipitation of solids. This evaporation is best carried out under reduced pressure below atmospheric and at the correspondingly low temperatures at which the water is vaporized under the reduced pressure. With or without being thus concentrated, the solution freed of catalyst is heated under autogenously developed pressures at temperatures above about 200° C. to convert the polymerizable salt of the xylylene diamine and dicarboxy acid into the corresponding mono-amide having the structure

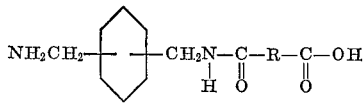

in which R is as defined above.

By heating the solution of this amide, with or without mixing it wth another monomeric material copolymerizable with the amide, under pressures reduced to about atmospheric or lower to vaporize water and then under an atmosphere of inert gas, the corresponding polyamide or copolymer is obtained. Since the formation of these polymers involves liberation of water from the amide, the polymerization is favored by passing a dry inert gas in contact with the amide while it is being heated to sweep out the evolved water vapor.

The significant steps of the process for the production of polymers from a solution of the polymerizable salt of the amine and dicarboxy acid produced by my process for hydrogenating a cyano compound in the presence of a dicarboxy acid, are as described above. As to specific operating conditions which can be employed in those steps, they can be those known to the art for converting the salt of a diamine with a dicarboxy acid to the amide of the dicarboxy acid and polymerizing that amide. My invention in the combination of steps by which a polyamide is produced resides in the discovery that the reaction product produced by my novel procedure for hydrogenating the cyanobenzylamines or the phthalonitriles is principally composed of polymerizable salts, and the composition of the solution obtained, after separation of the catalyst, is such that it can be treated by known procedures to produce the polyamides or copolymers of these polymerizable salts, rather than, as heretofore, the desired diamine and dicarboxy acid being separately produced and used in preparing a suitable mixture for treatment to produce the desired polymers.

The composition of the solutions of polymerizable salts obtained by reduction of the cyanobenzylamines in the presence of the dicarboxy acids are especially adaptable for being treated to form high molecular weight polymers. My combination of novel processes for the production of solutions of the polymerizable salts, with treatment of the resulting solution to form a polymer, is especially suitable for producing from the cyanobenzylamine and dicarboxy acids polymers which can be spun into cold-drawable fibers.

Solutions resulting from the hydrogenation of the phthalonitriles generally give polymers of low molecular weight. These are suitable for making moldings or films. However, I prefer to recover the polymerizable salt from these solutions and to treat a solution of the salt in water to convert it into the amide and the latter into the high molecular weight polymers which are suitable for spinning into cold-drawable fibers. This recovery of the polymerizable salt may be accomplished by evaporating the solution, after separation from the catalyst, to concentrate it and cooling the concentrated solution to crystallize the polymerizable salt. Other methods of recovering the polymerizable salt and converting it into a polyamide or copolymer will be particularly described in connection with the following examples of processes embodying my invention:

EXAMPLE 1

A commercial 5% palladium-on-carbon hydrogenation catalyst was placed in a stainless steel autoclave equipped with a magnetically operated dasher to agitate its contents. After thoroughly flushing this reactor and catalyst with nitrogen, a nitrogen purged solution in water of meta-cyanobenzylamine and adipic acid in a 1/1.01 mole ratio, containing 12 wt. percent solids (total of the amine and acid) was introduced. The total amount of this solution was such that it occupied about 28% of the free space in the reactor. The catalyst amounted to 8% by weight of the cyanobenzylamine. The reactor was swept with hydrogen gas to remove the nitrogen, filled with hydrogen under a pressure of 360 p.s.i. and closed. The contents of the reactor are agitated, heated, and maintained at temperatures in the range 43° C. to 47° C. over a period of 15 minutes. The pressure of the hydrogen decreased to 210 p.s.i. as a result of reaction of the hydrogen with the cyanobenzylamine. No further pressure changes were observed after several minutes' time, signalling the end of the reaction of the hydrogen with the cyano compound present. The amount of hydrogen absorbed corresponded to about 100% hydrogenation of the cyanobenzylamine to xylylene diamine.

The reactor was flushed with nitrogen and its content of solution and catalyst filtered to remove the catalyst. The filtrate was concentrated under 20–100 mm. Hg pressure on a steam bath and the resulting aqueous solution containing 35 wt. percent of m-xylylene diamine-adipic acid salt was heated in an oxygen free nitrogen atmosphere, first under autogenous pressure for a period of 2 hours at 270° C. to convert the salt to the amide, and then for an additional hour with the pressure gradually released to about atmospheric and the temperature increased to 280° C. to vaporize and remove water. After heating the residual molten material in a stream of dry nitrogen gas for an additional period of 3½ hours at 280° C., a polyamide having a melting point of 226°–230° C. and reduced viscosity of 0.58 was obtained. This polymer was spun into filaments which, after cold drawing, had a UTS of 4–5 g./d., and a UE of 15–25%.

Throughout this specification reduced viscosities are those calculated from the viscosities at 25° C. of 0.3–0.5 weight percent solutions of the polymer in a mixture of phenol and tetrachloroethane in a 60/40 ratio by volume.

EXAMPLES 2–10

The procedure employed in Example 1 above was modified to employ the reaction conditions shown in Table A below for hydrogenating solutions in water for the cyanobenzylamines and dicarboxy acids in a 1/1.01 mole ratio in the presence of commercial 5% palladium-on-carbon hydrogenation catalysts. The catalyst amounted to 5–8% by weight of the cyanobenzylamine present. Examples 2 and 7 were carried out in a stainless steel vessel and agitated with an anchor type agitator. Example 6 was carried out in a shaken stainless steel autoclave, Examples 3, 4 and 9 in a shaken glass bomb, and Examples 5 and 8 in the reactor used in Example 1. "Percent of free space" in Table A refers to that portion of the total free space in the reactor occupied by the materials initially supplied. The maximum and minimum pressures given represent the range of pressures maintained during the course of the reaction. The time required for completion of the hydrogenation, as indicated by constant pressure readings, is also given.

of the hydrogenation, represent losses of the salt in the mother liquors from which it was separated and losses incidental to the handling of the materials in recovering the isolated salt.

The solutions of hydrogenation product produced by these examples were filtered to remove the catalyst. In Examples 2 and 7 the filtrates were heated in three steps, first under autogenous pressure, then with release of the pressure, and finally at about atmospheric pressure, to polymerize their content of polymerizable salt of xylylene diamine-dicarboxy acid. In Examples 5 and 8 the filtrates were first concentrated on a steam bath under 20–100 mm. Hg pressure and the concentrates heated in those three steps.

In Examples 3, 4, 6 and 9 the polymerizable salts were recovered by heating the filtrate with an equal volume of isopropanol and then allowing the solution to cool slowly to precipitate the salt. The melting points and percent yields of the recovered salts were as follows:

| Example | 3 | 4 | 6 | 9 |
|---|---|---|---|---|
| M.P. (° C.) | 145–8 | 208–10 | 190–194 | 245 |
| Percent Yield | 91 | 85 | 80 | 80 |

In Examples 3, 4 and 6 solutions in water of the recovered salts were heated in the three steps described above to produce the polymers.

The following Table B shows the weight percent of the salt of xylylene diamine and dicarboxy acid in the filtrate or solution in water of the recovered salt which was treated to polymerize that salt, the conditions with respect to time and temperature maintained in each of the three steps of treating the concentrated solution or filtrate, and the melting points and reduced viscosities of the polymers.

*Table B*

| Ex. | Conditions of Treatment | | | | Character of Polymer | |
|---|---|---|---|---|---|---|
| | Material Treated | Autogenous Pressure | Water Distillation | Inert Gas Sweep | M.P.,° C. | $\eta_r$ |
| 2 | Filtrate (40% solids) | 2 hrs., 230° C | 1.5 hrs., 240° C | 4 hrs., 245° C | 180–185 | 0.55 |
| 3 | Salt Solution (67% solids) | 2 hrs., 210° C | 2 hrs., 240° C | 2 hrs., 240° C | 182–185 | 1.14 |
| 4 | Salt Solution (67% solids) | 2 hrs., 290° C | 2 hrs., 295° C | 2 hrs., 295° C | 272–283 | 0.77 |
| 5 | Filtrate (19% solids) | 2 hrs., 260° C | 2 hrs., 265° C | 3 hrs., 275° C | 242–248 | 0.56 |
| 6 | Salt Solution (40% solids) | 2 hrs., 240° C | 1 hr., 255° C | 4 hrs., 255° C | 230–234 | 0.70 |
| 7 | Filtrate (40% solids) | 2 hrs., 240° C | 1.5 hrs., 260° C | 4 hrs., 260° C | 198–210 | 0.50 |

In Example 8, caprolactam amounting to 38 parts by weight was added to the concentrated filtrate containing

*Table A*

| Ex. | Starting Solution | | | | Hydrogenation Conditions | | | |
|---|---|---|---|---|---|---|---|---|
| | Cyanobenzylamine | Dicarboxy Acid | Wt. Percent Solids | Percent of free space | H₂ Pressure (p.s.i.) | | Temp., ° C. | Time (Min.) |
| | | | | | Max. | Min. | | |
| 2 | Meta | Sebacic | 40 | 86 | 810 | 570 | 66–70 | 18 |
| 3 | Meta | do | 20 | 95 | 50 | 35 | 37–45 | 120 |
| 4 | Para | do | 8 | 95 | 50 | 41.5 | 33–46 | 80 |
| 5 | {30% meta / 70% para} | do | 14 | 72 | 800 | 660 | 42–46 | 22 |
| 6 | Meta | Adipic | 30 | 80 | 200 | 60 | 50–70 | 180 |
| 7 | {80% meta / 20% para} | do | 40 | 89 | 800 | 570 | 63–68 | 17 |
| 8 | Para | do | 17 | 72 | 800 | 580 | 52–54 | 14 |
| 9 | Para | do | 17 | 95 | 50 | 35 | 52–42 | 120 |

In each of these Examples 2–9, the amount of hydrogen absorbed corresponded to about 100% of that required to reduce the cyano groups of the cyano compound present to the amino; or in other words 100 percent completion of the hydrogenation of the cyano compound. In Examples 3, 4, 6 and 9, in which the polymerizable salt was isolated, the differences between the percent yields of recovered salt and these 100% values for completion about 62 parts by weight of the salt of p-xylylene diamine and adipic acid in 110 parts by weight water. The mixture was then heated under autogenous pressure to convert the salt to xylylene adipamide.

In Example 9 the polymerizable salt of p-xylylene diamine and adipic acid recovered as described above, amounting to 62 parts, was added to 50 parts water and 38 parts by weight caprolactam. This mixture was heated under autogenous pressure to convert the salt of p-xylene diamine and adipic acid into the amide.

For Example 10 portions of the salts isolated in Example 3 and 4 were combined in the weight ratios of 30 parts of the salt obtained in Example 3, to 70 parts of the salt obtained in Example 4, and added to 50 parts water. The solution of these mixed salts was heated to form the amides.

In each of these Examples 8, 9 and 10, the mixture thus prepared was heated under atmospheric pressure to vaporize the water and then in a stream of dry nitrogen gas to produce the several copolymers of the xylylene adipamides.

Table C contains the data for treating these mixtures of filtrate and salt solutions and the character of the polymers obtained.

*Table C*

| Ex. | Conditions of Treatment | | | | Character of Polymer | |
|---|---|---|---|---|---|---|
| | Material Treated | Autogenous Pressure | Water Distillation | Inert Gas Sweep | M.P.,° C. | $\eta_r$ |
| 8 | Filtrate + caprolactam (48% solids) | 2 hrs., 250° C | 1 hr., 270° C | 4 hrs., 270° C | 225–227 | 0.72 |
| 9 | 67% (salt + caprolactam) solution | 2 hrs., 250° C | 2 hrs., 260° C | 2 hrs., 260° C | 236–245 | 0.74 |
| 10 | 67% salt solution | 2 hrs., 265° C | 2 hrs., 275° C | 2 hrs., 275° C | 252–256 | 0.79 |

The polymers of these examples were spun into fibers and cold drawn. The tensile strengths and ultimate elongation of the drawn fibers are shown in the following Table D.

*Table D*

| Ex. | UTS (g.d.) | UE (percent) |
|---|---|---|
| 2 | 4–4.5 | 15–20 |
| 3 | 5.1 | 16.4 |
| 4 | 4–5 | 15–20 |
| 5 | 3–5 | 15–20 |
| 6 | 4–5 | 15–20 |
| 7 | 3–4 | 10–15 |
| 8 | 4–5 | 15–20 |
| 9 | 4–5 | 10–15 |
| 10 | 4–5 | 15–17 |

EXAMPLES 11–13B

The procedure of Example 1 above was modified to employ the reaction conditions shown in Table E below for hydrogenating a slurry in water of meta-phthalonitrile and a dicarboxy acid in a 1/1.1 mole ratio in the presence of commercial 5% palladium-on-carbon hydrogenation catalysts. In each example the catalyst amounted to 8% by weight of the phthalonitrile. The mixtures were agitated in a stainless steel reaction vessel provided with an anchor type agitator. The hydrogen pressures were maintained in the range of 500 p.s.i. at the start to a minimum of 400 p.s.i. and the completion of the hydrogenation was determined as described in Example 1.

*Table E*

| Ex. | Starting Slurry | | | | Hydrogenation Conditions | |
|---|---|---|---|---|---|---|
| | Phthalonitrile | Dicarboxy Acid | Wt. Percent Solids | Percent of free space | Temp., ° C. | Time (Mins.) |
| 11 | Meta- | Adipic | 12.5 | 73 | 28 | 105 |
| 12 | Meta- | do | 12.5 | 73 | 26–28 | 120 |
| 13 A–B | Meta- | Sebacic | 15 | 73 | 50 | 90 |

The resulting solution of hydrogenation product was filtered to remove the catalyst. In Example 11 the filtrate was vacuum distilled under 20–100 mm. Hg pressure to concentrate it to about 70% solids content and a polymerizable salt having a melting point of 194° C. was precipitated and recovered in the same manner as in above Examples 6 and 9. In Examples 12 and 13A and 13B, the filtrates were concentrated to a 50% solids content. These concentrates were titrated with a solution of meta-xylylene diamine to pH 7.4 (Example 12) and 7.7 (Examples 13A and 13B) and were decolorized by adding about 5 wt. percent activated charcoal, heating for 15–30 minutes and filtering. In Example 12 the filtrate and in Example 13A a portion of the filtrate thus obtained was treated as in Example 1, to polymerize its content of polymerizable salt of xylylene diamine and the dicarboxy acid. In Example 13B the remaining portion of the concentrated filtrate, after adjustment of its pH and treatment with activated charcoal, was heated with an equal volume of isopropanol, and cooled slowly to allow precipitation of the salt of meta-xylylene diamine and sebacic acid. The precipitate was filtered off and further purified by solution and reprecipitation from a 50/50 (by volume) water-isopropanol mixture. The thus isolated and purified salt of meta-xylylene diamine and sebacic acid, having a melting point of 134° C., was dissolved in water to form a 50% solution of the salt and this solution treated to polymerize the salt.

The conditions of polymerizing the xylylene diamine salts either in the treated filtrates or as solutions of the recovered salts in water, and the properties of the polymers produced are shown below in Table F.

*Table F*

| Ex. | Material Treated | Autogenous Pressure | Water Distillation | Inert Gas Sweep | Polymer | |
|---|---|---|---|---|---|---|
| | | | | | M.P., ° C. | $\eta_r$ |
| 11 | Salt | 2 hrs., 220° C | 1 hr., 210–240° C | 4 hrs., 255° C | 226–233 | 0.66 |
| 12 | Filtrate | 1.5 hrs., 225° C | 1 hr., 240° C | 5 hrs., 250° C | 227–230 | 0.55 |
| 13A | do | 1.5 hrs., 220° C | ½ hr., 225° C | 5 hrs., 245° C | 176–184 | 0.47 |
| 13B | Salt | 1.5 hrs., 220° C | ½ hr., 245° C | 5 hrs., 250° C | 175–185 | 0.55 |

EXAMPLE 14

The procedure employed in Example 1 was used for hydrogenation of a slurry of terephthalonitrile and sebacic acid containing 9% of those two compounds in a 1/1 mole ratio in aqueous isopropyl alcohol containing a 50/50 ratio by volume of water to isopropyl alcohol. The hydrogenation was carried out in a shaken glass bomb at temperatures in the range 38° C. to 42° C. under an initial hydrogen pressure of 50 p.s.i. The hydrogen pressure dropped to 35 p.s.i. over a period of about 100 minutes and additional hydrogen was admitted to bring the pressure back to 50 p.s.i. A further drop to 47 p.s.i. final pressure at 40° C. required an additional 20 minutes, signalling completion of the hydrogenation in a total reaction time of about 120 minutes.

The solution produced by this hydrogenation was filtered to remove the catalyst and the filtrate concentrated to a 50% by weight solids content by distillation under 20–100 mm. Hg pressure. The concentrated filtrate was heated with an equal volume of methanol and cooled to precipitate the salt. The polymerizable salt of para-xylylene diamine and sebacic acid thus obtained had a melting point of 203° C. It was recovered in an 81% yield based on the total phthalonitrile and sebacic acid supplied in making up the slurry which was hydrogenated.

EXAMPLES 15 AND 16

Slurries containing 9% terephthalonitrile and sebacic acid in a 1/1 mole ratio in aqueous methanol containing a 50/50 ratio by volume of water to methanol were hydrogenated, one at temperatures of 38° C. to 42° C. for 135 minutes (Example 15) and the other at temperatures of 42° C. to 46° C. for 140 minutes (Example 16). Otherwise, the procedures were the same as described for Example 14.

The filtrates from removal of the catalyst from the resulting solutions were concentrated to 50 wt. percent solids by evaporation under 20–100 mm. Hg pressure. The concentrated filtrate was heated with an equal volume of isopropanol and cooled slowly to precipitate the salt. In Example 15 a 74% yield and in Example 16 an 80% yield of polymerizable salt of para-xylylene diamine and sebacic acid was obtained, based on the phthalonitrile and sebacic acid supplied to the process. The respective melting points of these salts were 202° C. and 201° C.

EXAMPLES 17–21

The procedure of Example 14 was followed in hydrogenating solutions of cyanobenzylamine and dicarboxy acids in water containing a 1/1.01 mole ratio of the cyanobenzylamine to dicarboxy acid. The hydrogenation conditions were as shown in Table G below. The catalyst was a 5% palladium-on-carbon catalyst, amounting to 8% by weight of the cyanobenzylamine present.

In Examples 17 and 21, the filtrate from which the catalyst had been removed was concentrated on a steam bath under reduced pressures to about 50% solids. To this heated concentrate hot methanol and isopropanol were added, each in amount equal to the volume of the concentrate, and the solution was then cooled slowly to precipitate the salt. In Examples 18 and 19, the filtrate was heated with 1 to 3 times its volume of isopropanol and cooled to precipitate the salt. In Example 20 the slurry obtained by the hydrogenation was heated with 3 times its volume of water to dissolve the xylylene diamine salt of succinic acid and filtered free of catalyst. The filtrate was cooled to precipitate the salt.

The melting points of the polymerizable salts thus recovered and the yields in percent by weight based on the cyanobenzylamine and dicarboxy acid supplied, are given in the following Table H.

Table H

| Example | 17 | 18 | 19 | 20 | 21 |
|---|---|---|---|---|---|
| M.P. of salt, ° C. | 238–242 | 275–280 | 256–257 | 350–365 | 305 |
| Percent yield | 99 | 75 | 91 | 83 | 89 |

EXAMPLES 22 and 23

The procedure of Example 14 was employed for the hydrogenation of solutions of para-cyanobenzylamine and adipic acid in water in the mole ratio of 1/1.01.

In Example 22 the catalyst was a commercial 2% palladium-on-carbon hydrogenation catalyst, amounting to 8% by weight of the cyanobenzylamine. The solution contained 12 wt. percent of the cyanobenzylamine and adipic acid, and was hydrogenated at temperatures of 38° C. to 50° C. under an initial hydrogen pressure of 50 p.s.i. and a minimum pressure of 32 p.s.i. for 150 minutes.

In Example 23, 5% of a commercial platinum dioxide hydrogenation catalyst was present. The solution contained 7 wt. percent cyanobenzylamine and adipic acid, and was hydrogenated at 33° C. to 48° C., with an initial hydrogen pressure of 50 p.s.i. and minimum pressure of 40 p.s.i. for a period of 90 minutes.

In both examples the theoretical amount of hydrogen for reduction of the cyanobenzylamine present to the xylyene diamine was absorbed with formation of the polymerizable salt of p-xylylene diamine and adipic acid.

I claim:
1. The process for the production of a polymerizable salt of a xylylene diamine which comprises contacting a solution of a cyano compound selected from the group consisting of meta- and para-cyanobenzylamines, isophthalonitrile and terephthalonitrile with hydrogen in the presence of a hydrogenation catalyst and an organic dicarboxy acid until said cyano compound is hydrogenated to the corresponding xylyene diamine and a solution of the polymerizable salt of said xylylene diamine and said dicarboxy acid is formed, said dicarboxy acid having the structure HOOC—R—COOH wherein R is a divalent organic radical selected from the group consisting of saturated aliphatic radicals containing at least two carbon atoms in an alkylene carbon chain connecting the two carboxy groups, bis-(alkylene)aromatic radicals and saturated cycloaliphatic and arylene radicals in which the two carboxy radicals are on separate nonadjacent carbon atoms in the ring structure, said cyano compound and said dicarboxy acid being present in about a 1 to 1 mol ratio and being dispersed in a solvent for said cyano compound and said dicarboxy acid, which solvent, under hydrogenating conditions is not reactive with said cyano

Table G

| Ex. | Starting Solution | | | | Hydrogenation Conditions | | | |
|---|---|---|---|---|---|---|---|---|
| | Cyano-benzyl-amine | Dicarboxy Acid | Wt. Percent Solids | Percent of free space | H₂ Pressure (p.s.i.) | | Temp., ° C. | Time (Min.) |
| | | | | | Max. | Min. | | |
| 17 | Meta- | Isophthalic | 13 | 95 | 50 | 33 | 29–49 | 100 |
| 18 | Meta- | Terephthalic | 13 | 95 | 50 | 32 | 31–48 | 120 |
| 19 | Para- | Isophthalic | 13 | 95 | 50 | 32 | 40–53 | 100 |
| 20 | Para- | Terephthalic | 7 | 95 | 50 | 41 | 38–41 | 40 |
| 19 | Para- | Succinic | 11 | 95 | 50 | 32 | 36–44 | 120 | compound, said dicarboxy acid, said xylylene diamine and said polymerizable salt.

2. A process for the production of a polymerizable salt of xylylene diamine which comprises mixing together in a solvent selected from the group consisting of water and aqueous solutions of a saturated aliphatic alcohol having from 1 to 5 carbon atoms, a cyano compound selected from the group consisting of meta- and para-cyanobenzylamine, isophthalonitrile and terephthalonitrile and a dicarboxy acid having the structure HOOC—R—COOH wherein R is a divalent hydrocarbon radical selected from the group consisting of saturated aliphatic radicals containing at least two carbon atoms in an alkylene carbon chain connecting the two carboxy groups bis-(alkylene)aromatic radicals and saturated cycloaliphatic, and arylene radicals in which the two carboxy groups are on separate non-adjacent carbon atoms in the ring structure, said cyano compound and said dicarboxy acid being present in about a 1 to 1 mol ratio, contacting the mixture with hydrogen in the presence of a hydrogenation catalyst selected from the group consisting of palladium, platinum, ruthenium, rhodium, Raney nickel and Raney cobalt and recovering the polymerizable salt.

3. The process of claim 2 wherein said mixture contains about 1 to 10 mol percent excess of dicarboxy acid over a 1 to 1 mol ratio of cyano compound to dicarboxy acid.

4. The process of claim 2 wherein the solvent is water.

5. The process of claim 2 in which the catalyst is palladium distributed on a porous carbon support.

6. The process of claim 2 wherein R is a saturated aliphatic hydrocarbon radical having from 2 to 16 carbon atoms.

7. The process of claim 2 in which the dicarboxy acid is isophthalic acid.

8. The process of claim 2 in which the dicarboxy acid is terephthalic acid.

References Cited in the file of this patent

UNITED STATES PATENTS

| | | |
|---|---|---|
| 2,766,221 | Lum et al. | Oct. 9, 1956 |
| 2,766,222 | Lum et al. | Oct. 9, 1956 |
| 2,776,950 | Lum et al. | Jan. 8, 1957 |
| 2,784,230 | Ferstandig | Mar. 5, 1957 |
| 2,878,235 | Butler et al. | Mar. 17, 1959 |
| 2,891,088 | Condo et al. | June 16, 1959 |
| 2,904,536 | Reith | Sept. 15, 1959 |